(12) United States Patent
Sakuyama

(10) Patent No.: US 6,472,655 B1
(45) Date of Patent: Oct. 29, 2002

(54) REMOTE AMPLIFIER FOR AN OPTICAL TRANSMISSION SYSTEM AND METHOD OF EVALUATING A FAULTY POINT

(75) Inventor: Hiroshi Sakuyama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/396,325

(22) Filed: Sep. 15, 1999

(30) Foreign Application Priority Data

Sep. 18, 1998 (JP) ........................................... 10-264429

(51) Int. Cl.[7] .................................................. G01J 1/04
(52) U.S. Cl. .............................. 250/227.11; 250/227.15; 250/227.24; 356/73.1; 359/110
(58) Field of Search ....................... 250/227.11, 227.15, 250/227.16, 227.14; 356/73.1; 370/242, 243; 359/110, 141, 143, 174, 177, 179, 151, 195, 341

(56) References Cited

U.S. PATENT DOCUMENTS 5,528,404 A * 6/1996 MacKichan ................. 359/110
5,737,118 A * 4/1998 Sugaya et al. ............... 359/341
5,966,206 A * 10/1999 Jander ........................ 356/73.1

FOREIGN PATENT DOCUMENTS

| JP | 58-75110 | 5/1983 |
|----|----------|--------|
| JP | 4-264430 | 9/1992 |
| JP | 5-102583 | 4/1993 |
| JP | 5-292038 | 11/1993 |
| JP | 6-97895 | 4/1994 |
| JP | 6-268597 | 9/1994 |
| JP | 6-310791 | 11/1994 |
| JP | 7-27944 | 1/1995 |
| JP | 8-285723 | 11/1996 |
| JP | 9-261187 | 10/1997 |

* cited by examiner

Primary Examiner—Que T. Le
Assistant Examiner—Thanh X. Luu
(74) Attorney, Agent, or Firm—Dickstein, Shapiro, Morin & Oshinsky, LLP

(57) ABSTRACT

A remote amplifier of the present invention includes an optical splitter and an optical combiner respectively connected to an input and an output thereof. One end of the split output of the splitter is used as an input port while one end of the combiner is used as an output port. When a fault occurs at a certain point on an optical transmission path, an ODOR (Optical Time Domain Reflect meter) is connected to either one of the input port and output port for evaluating the faulty point.

6 Claims, 6 Drawing Sheets

REMOTE AMPLIFIER FOR AN OPTICAL TRANSMISSION SYSTEM AND METHOD OF EVALUATING A FAULTY POINT

BACKGROUND OF THE INVENTION

The present invention relates to a remote amplifier for a repeating type optical fiber transmission system and a method of evaluating the faulty point of an optical fiber.

Transmission systems using optical fibers are generally classified into two types, i.e., a repeating type system and a non-repeating type system. The repeating type system includes repeaters arranged at pre selected intervals on a transmission path connecting opposite end offices. The non-repeating type system connects opposite end offices without any repeater arranged on a transmission path. In a submarine optical fiber cable transmission system, for example, the repeating type system and non-repeating type system are respectively used for long distance, deep sea applications and short distance, shallow sea applications. While the non-repeating type system does not need repeaters or power supply devices therefore and saves cost, a transmission distance available with such a system is limited due to the absence of repeaters. A remote pumping system is a specific form of the non-repeating type system devised, to extend the transmissible distance. In the remote pumping system, a remote amplifier is inserted in a transmission path at a pre selected distance from opposite end offices. The remote amplifier receives exciting light, or pumping light, from either one of the end offices and amplifies signal light.

When a fault occurs in an optical fiber cable in the optical fiber transmission system, e.g., when the cable snaps or when a light loss increases, it is necessary that the opposite end stations be capable of evaluating the faulty point. In the non-repeating type system not effecting power supply, a faulty point is evaluated mainly by using optical fibers. A fault of an optical fiber cable is ascribable to the snapping of the cable itself or the cutting of one or more of optical fibers included in the cable. It is therefore desirable to evaluate a faulty point fiber by fiber.

Fiber-by-fiber faulty point evaluation can be done by using an ODOR (Optical Time Domain Reflect meter; optical pulse tester) which will be described specifically later. To evaluate a faulty point with an ODOR, optical test pulses are input to the end of a subject optical fiber at an end office. On reaching a faulty point of the fiber, the test pulses are reflected and diffused and returned to the end office. The resulting reflected light and backward diffused light are observed at the end office to determine the kind of the fault, e.g., cutting or an increase in light loss.

Japanese Patent Laid-Open Publication No. 9-261187 (document 1 hereinafter) teaches a specific remote amplifier and a specific method of evaluating a faulty point. In accordance with the document 1, it is possible to search for a faulty point in all the sections between end offices included in an optical communication system. However, the document 1 has the following problems unsolved. To evaluate a fault occurred at a certain point between remote amplifiers, the method evaluates the faulty point with only a single remote amplifier closer to the faulty point and therefore fails to evaluate the faulty point with accuracy. Moreover, the remote amplifier is constructed such that an optical signal for evaluating a faulty point is propagated through an erbium fiber. It follows that a propagation loss ascribable to the erbium fiber is great in a 1.3 $\mu$m or a 1.55 $\mu$m wavelength band particular to an ordinary ODOR. The method therefore needs a special 1.6 $\mu$m wavelength band ODOR and increases the evaluation cost.

Summary of the Invention

It is therefore an object of the present invention to provide a method capable of enhancing accurate faulty point evaluation with an ordinary inexpensive ODOR.

A remote amplifier of the present invention includes a transmission port and an optical splitter connected to the transmission port via a transmission path. An optical combiner is connected to the optical splitter via an erbium fiber. A first branch port is connected to a branch path extending from the optical splitter.

With the above remote amplifier, it is possible to branch an optical signal being propagated through the transmission path and output or input it via the first branch port.

Further, a second branch port is connected to a branch path extending from the optical combiner. This also makes it possible to branch the optical signal being propagated through the transmission path and output or input it via the second branch port.

A faulty point evaluating method of the present invention begins with the step of sending signal light for faulty point evaluation from one end office to the above remote amplifier via an optical transmission path. The signal light is used to determine whether a fault has occurred in a first section between the receipt side of the remote amplifier and the end office or whether it has occurred in a second section between the transmission side of the remote amplifier and the other end office. Subsequently, signal light for faulty point evaluation is sent from one of two branch ports of the remote amplifier closer to the detected faulty section than the other. The resulting light reflected and diffused at the faulty point is returned to the above one branch port and detected for the evaluation of the fault. Because this method sends the light for evaluation without the intermediary of an erbium fiber, it is practicable with an ordinary ODOR and therefore reduces evaluation cost.

BRIEF DESCRIPTION OF THE DRAWINGS

The above and other objects, features and advantages of the present invention will become apparent from the following detailed description when taken with the accompanying drawings in which.

DESCRIPTION OF THE PREFERRED EMBODIMENTS

Figure 1:
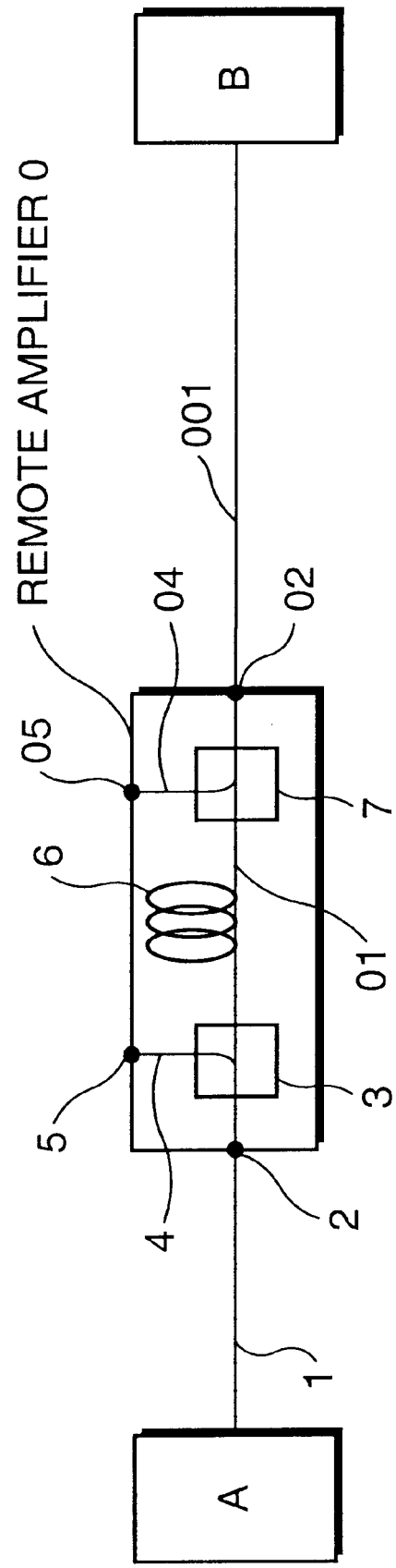
FIG. 1 is a block diagram schematically showing an embodiment of the present invention.

Referring to FIG. 1 of the drawings, a repeating type optical transmission system is shown which includes a remote amplifier embodying the present invention. As shown, the system includes a transmission path 1 connected to an end office A at one end thereof. The other end of the transmission path 1 is connected to a transmission port 2 included in a remote amplifier 0. The transmission port 2 is connected to a transmission path 01 which is, in turn, connected to an optical splitter 3. The optical splitter 3 branches the transmission path 01 into a branch path 4 and the transmission path 01. The branch path 4 is connected to an input branch port 5. The transmission path 01 extending out from the optical splitter 3 is connected to one end of an erbium fiber 6. The other end of the erbium fiber 6 is connected to an optical combiner 7 by the path 01. The optical combiner 7 branches the path 01 into a branch path 04 and the path 01. The branch path 04 is connected to an output branch port 05. The path 01 extending out from the optical combiner 7 is connected to a transmission port 02. The transmission port 02 is connected to one end of a transmission path 001 located outside of the remote amplifier 0. The other end of the transmission path 001 is connected to an end office B.

In operation, an optical signal issuing from the end office A is propagated through the transmission path 1 to the transmission port 2 of the remote amplifier 0. In the remote amplifier 0, the optical splitter 3 delivers the optical signal to the branch path 4 and transmission path 01. The optical signal input to the branch path 4 is fed to the input branch port 5. On the other hand, the optical signal input to the transmission path 01 is input to the erbium fiber 6. The erbium fiber 6 transfers the optical signal to the optical combiner 7. The optical combiner 7 delivers the optical signal to the branch path 04 and transmission path 01. The optical signal output to the branch path 04 is fed to the output branch port 05 while the optical signal output to the transmission path 001 is input to the transmission port 02. The optical signal input to the transmission port 02 is propagated through the transmission path 001 to the end office B.

The above operation also holds when the end offices A and B are replaced with each other.

Figure 2:
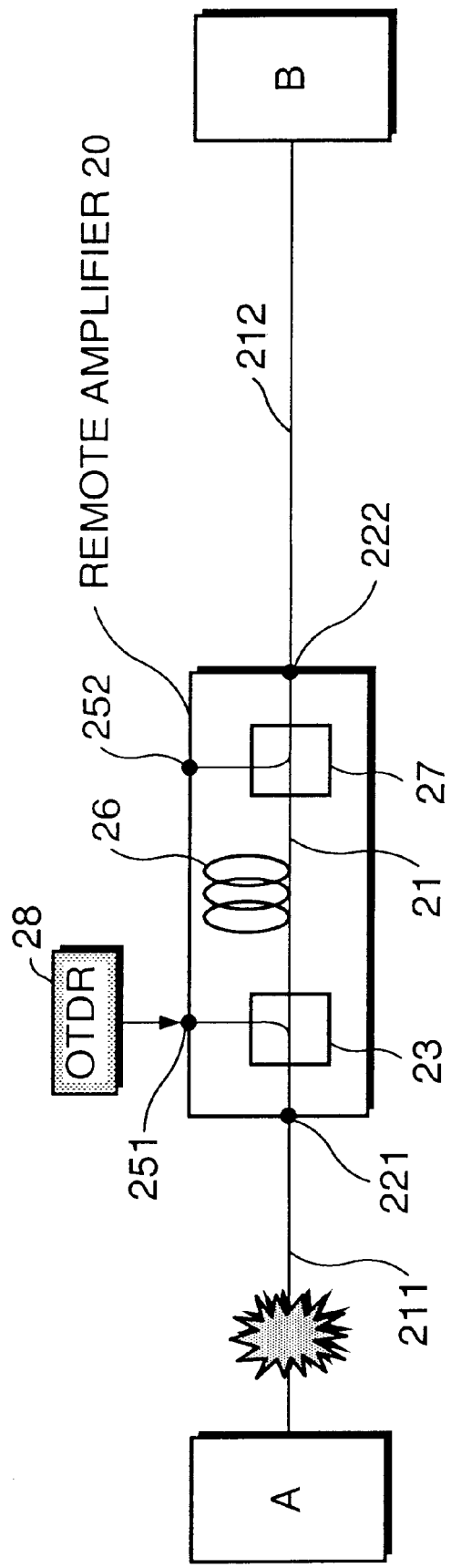
FIG. 2 is a block diagram schematically showing a faulty point evaluating method particular to the embodiment of FIG. 1.
Figure 6:
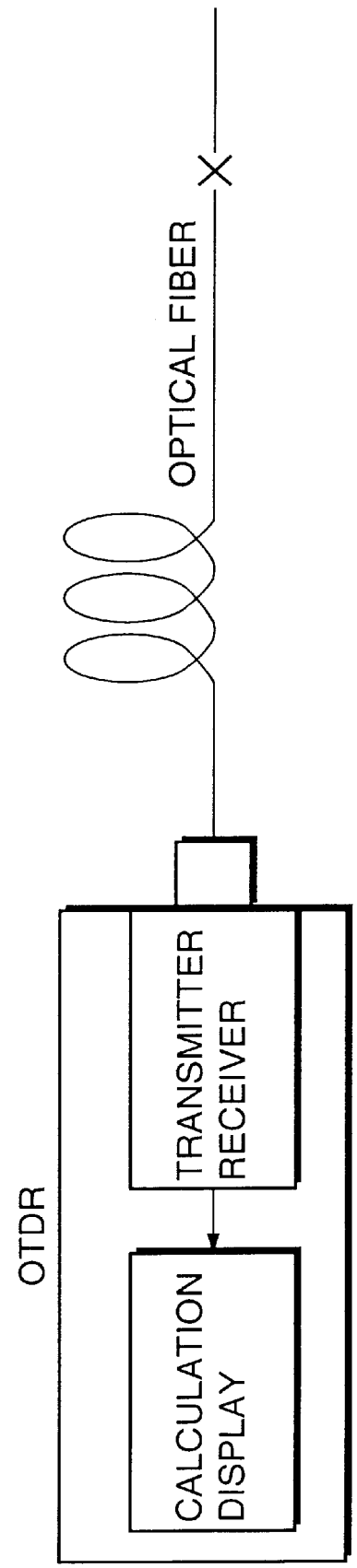
FIG. 6 is a schematic block diagram showing a specific configuration of an ODOR.

Reference will be made to FIG. 2 for describing a method of evaluating a faulty point by using an ODOR. FIG. 6 shows a specific configuration of an ODOR. As shown, the ODOR includes an optical transmitter and an optical receiver constructed into a single unit. Such a transmitter/receiver sends optical test pulses to an optical fiber connected to the ODOR and receives the resulting reflected light and backward diffused light returned via the above fiber. This type of ODOR has a dynamic range of about 40 DB and allows a faulty point on the optical fiber to be evaluated over a distance of about 200 km from an end office.

Referring again to FIG. 2, a section of a transmission path where a fault has occurred is determined first. Specifically, whether a fault has occurred at a section between an end office A and a remote amplifier 20 or whether it has occurred at a section between the remote amplifier 20 and an end office B is determined. This is effected from either one of the end offices A and B via an ODOR 28. In FIG. 2, a fault is assumed to have occurred at the section between the end office A and the remote amplifier 20, i.e., at the amplifier input section. The ODOR 28 is connected to an input branch port 251 closer to the faulty point than an output branch port 252. In FIG. 2, the ODOR 28 implemented by an ordinary ODOR as distinguished from an ODOR having a special wavelength.

Subsequently, the ODOR 28 sends an optical signal to the remote amplifier 20 via the input branch port 251. In the remote amplifier 20, the optical signal is transmitted through an optical splitter 23 to a transmission path 21 and then sent to the faulty point via a transmission port 221. The resulting reflected light and diffused light are returned from the faulty point to the ODOR 28. By examining the light returned to the OTDR28, it is possible to evaluate the faulty point.

As stated above, the input branch port 251 and output branch port 252 are located outside of the remote amplifier 20 as access ports for the ODOR 28. This allows a faulty point to be evaluated via the ODOR 28 at the middle of the repeating type of system.

When a fault occurs between the end office B and the remote amplifier 20, the ODOR 28 is connected to the output branch port 252 closer to the faulty point than the input branch port 251. This is also followed by the above procedure for evaluating the faulty point.

In FIG. 2, there are also shown transmission paths 211, 21 and 212, an optical splitter 23, an erbium fiber 26, an optical combiner 27, and a transmission port 222.

Figure 3:
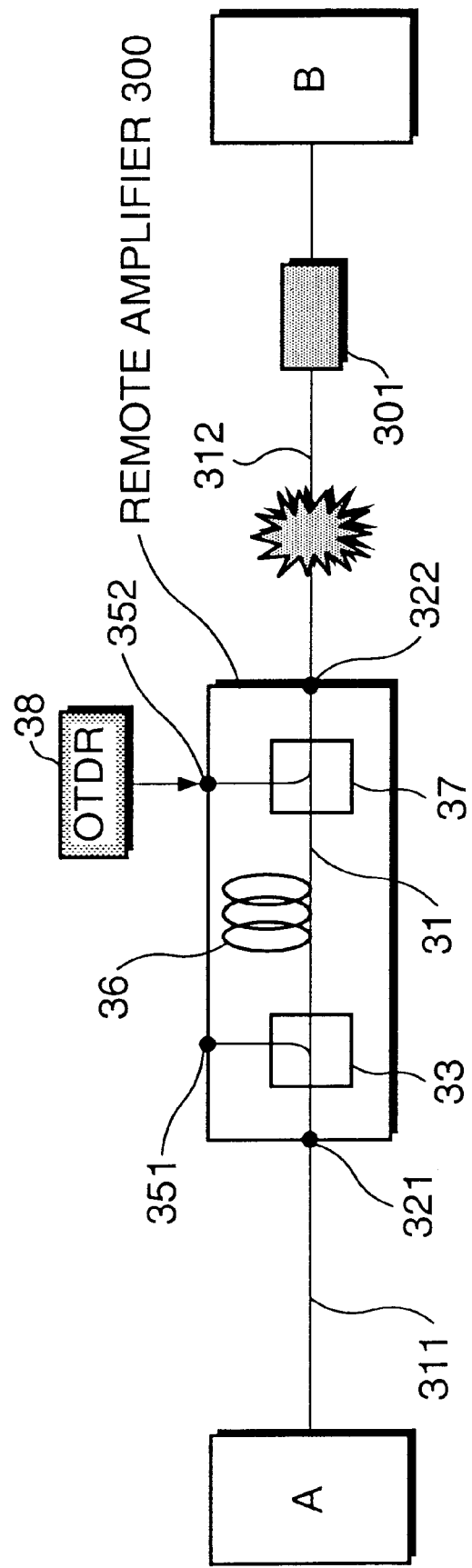
FIGS. 3, 4 and 5 are schematic block diagrams each showing a particular alternative embodiment of the present invention.

An alternative embodiment of the present invention will be described with reference to FIG. 3. This embodiment is applicable to an optical transmission system including two remote amplifiers by way of example. In FIG. 3, a fault is assumed to have occurred at a point between a remote amplifier 300 and an end office B. The section including the above faulty point is detected by the same procedure as described with reference to FIG. 2. Specifically, the end office B or an end office A can detect the faulty point and therefore the section including it. In FIG. 3, an ordinary ODOR 38 is connected to a branch port 352 assigned to a remote amplifier 300 and closer to the faulty point than the other branch port 351. At the same time, an ODOR is connected to a branch port assigned to the other remote amplifier 301 and closer to the faulty point, although not shown specifically.

In the above configuration, the ODOR 38 inputs an optical signal to the remote amplifier 300 via the branch port 352. The optical signal is routed through an optical combiner 37, a transmission path 31 and a transmission port 322 to the faulty point. The resulting reflected light and diffused light are returned from the faulty point to the ODOR 38 and examined thereby, so that the faulty point can be evaluated. The faulty point can also be evaluated via the remote amplifier 301 and an ODOR, not shown, connected thereto and independent of the remote amplifier 300.

As stated above, in the illustrative embodiment, a single faulty point is evaluated via two remote amplifiers 300 and 301. This enhances accurate faulty point evaluation more than the previous embodiment using a single remote amplifier. To further enhance accurate faulty point evaluation, the non-repeating type transmission system may include three or more remote amplifiers, if desired.

Assume that a fault occurs between the end office A and the remote amplifier 300 or between the end office B and the remote amplifier 301. Then, another remote amplifier may be positioned between the faulty point and the end office A or B in order to evaluate the faulty point in the same manner as in the above embodiment.

In FIG. 3, there are also shown a transmission path 311, a transmission port 321, an optical splitter 33, an erbium fiber 36, and a transmission path 312.

Figure 4:
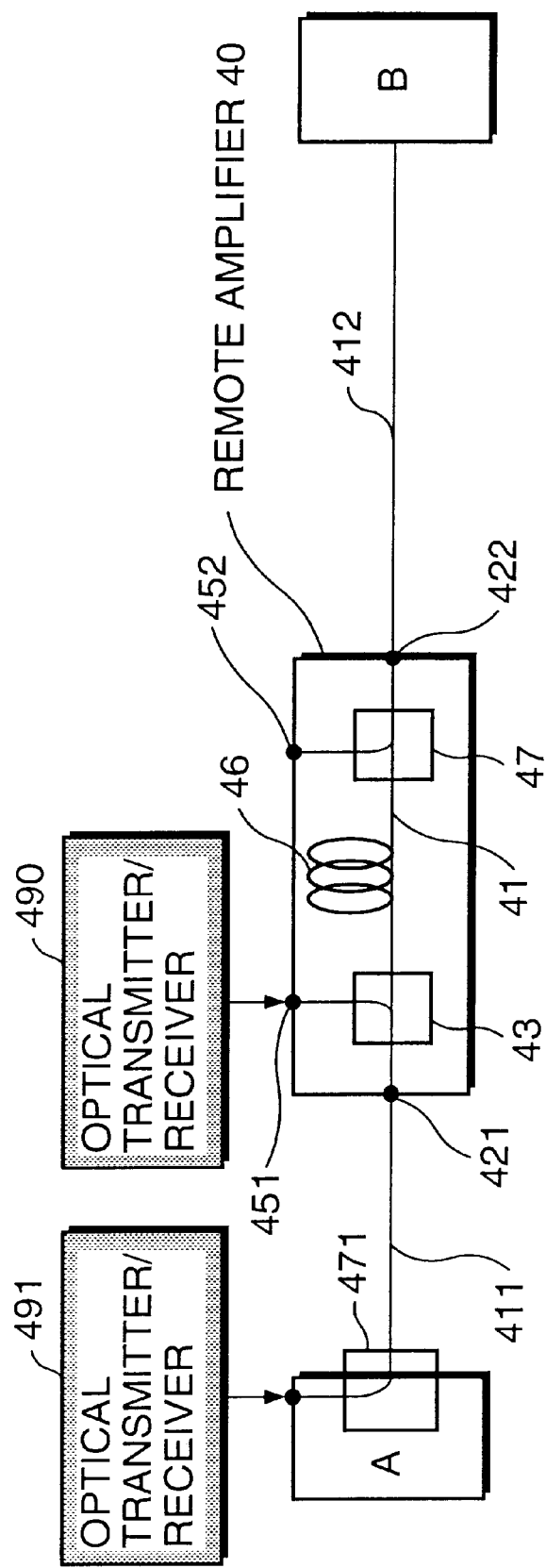

Reference will be made to FIG. 4 for describing another alternative embodiment of the present invention. As shown, an end office A includes an optical combiner 471 connected to a transmission path 411. An optical transmission unit 491 is connected to the end office A. An optical transmission unit 490 is connected to a branch port 451 included in a remote amplifier 40 and closer to the end office A than the other branch port 452.

In this embodiment, the remote amplifier 40 is capable of interchanging optical signals with the optical transmission unit 490 via the branch port 451 and with the optical transmission unit 491 via the end office A. Therefore, the end office A and remote amplifier 40 can effect optical communication between them.

A circuit for effecting the above optical communication may be laid independently of the transmission path 411 and a transmission path 41 included in the remove amplifier 40. Such a circuit allows communication to be held between the remote amplifier 40 and the endoffice A independently of optical signals to be transmitted. This circuit is available for, e.g., communication at the time of maintenance of the remote amplifier 40.

Further, if WDM is used for transmission, optical communication can share the same transmission paths 411 and 41 with optical signals to be transmitted, i.e., without resorting to the additional circuit independent of the transmission paths 411 and 41. In such a case, a wavelength range different from one assigned to optical signals will be assigned to optical communication.

Optical communication can also be held between an end office B and the remote amplifier 40 only if the endoffice A, transmission path 411 and branch port 451 are respectively replaced with the end office B, a transmission path 412 and a branch port 452 and if an optical combiner is included in the end office B.

In FIG. 4, there are also shown an optical splitter 43, an erbium fiber 46, transmission ports 421 and 422, and an optical combiner 47.

Figure 5:
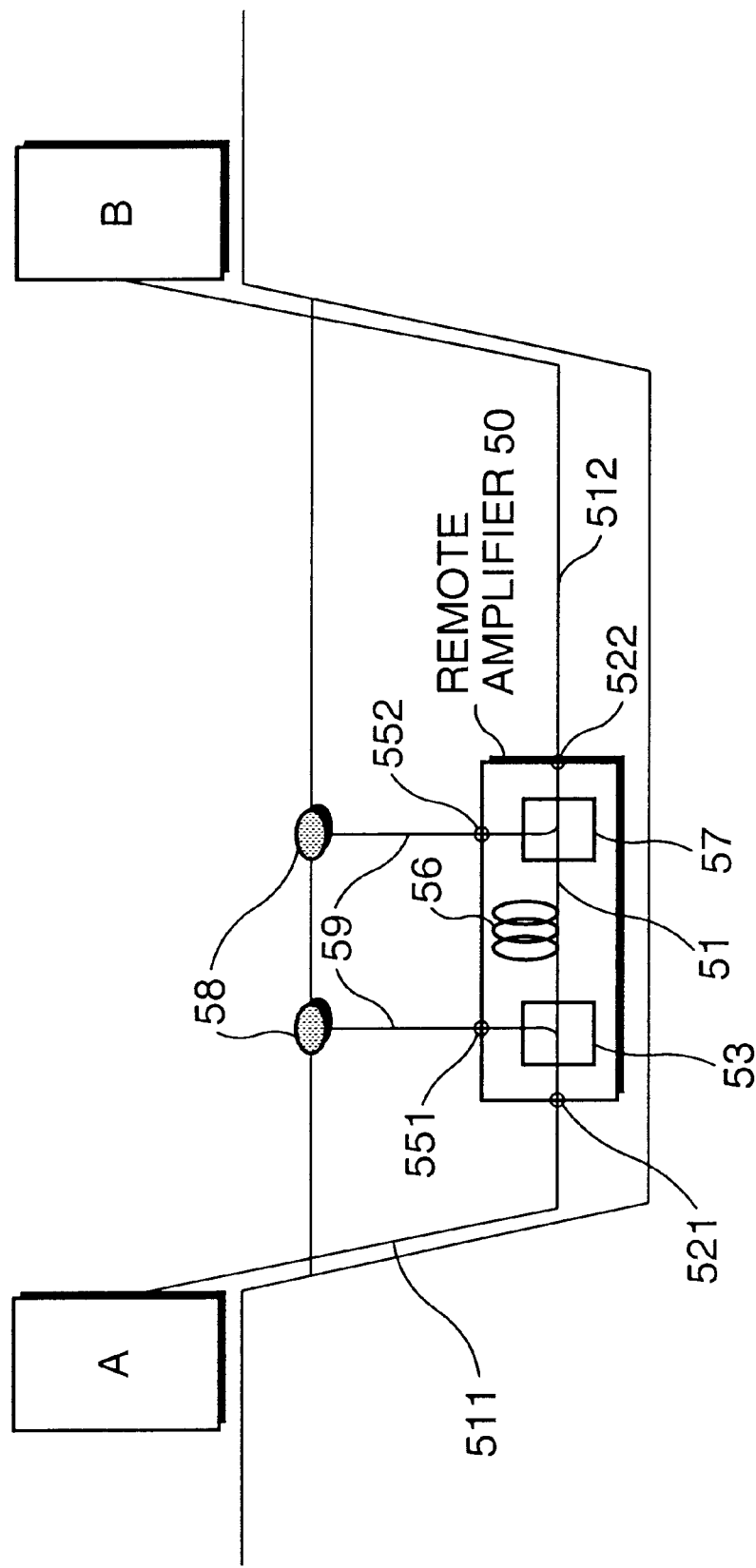

FIG. 5 shows a further alternative embodiment of the present invention. As shown, a remote amplifier 50 identical in configuration with the remote amplifier 20, FIG. 2, is positioned on the bottom of the sea and includes branch ports 551 and 552. Two optical fiber cables 59 respectively extend from the branch ports 551 and 552 to the surface of the sea. Two buoys 58 are respectively connected to the optical fiber cables 59 on the surface of the sea. An ODOR, not shown, is connected to one end of either one of the optical fiber cables 59 via the associated buoy 58. With this configuration, it is possible to evaluate a faulty point on an optical fiber cable over the entire range between end offices A and B.

The remote amplifier 50 additionally includes transmission ports 521 and 522, a transmission path 51, an optical splitter 53, an erbium fiber 56, and an optical combiner 57. There are also shown in FIG. 5 transmission paths 511 and 512.

What is claimed is:

1. A remote amplifier station for an optical transmission system comprising:
    an optical amplifier including a doped optical fiber, the optical fiber being responsive to a pumping signal to amplify an information carrying light signal so as to produce an amplified light signal;
    a first transmission port for connecting the optical amplifier to a first transmission path;
    a second transmission port for connecting the optical amplifier to a second transmission path;
    a first optical branching device connected to:
        couple a first amplified light signal from the optical amplifier and a light signal from a first optical test port to the first transmission path; and
        to split a light signal from the first transmission path into components for delivery to the first optical test port and to the optical amplifier; and
    a second optical branching device connected to:
        couple a second amplified light signal from the optical amplifier and a light signal from a second optical test port to the second transmission path; and
        split a light signal from the second transmission path into components for delivery to the second optical test port and to the optical amplifier.

2. A remote amplifier station according to claim 1, wherein the first optical branching device is an optical splitter and the second optical branching device is a combiner.

3. A remote amplifier station according to claim 1, wherein the optical amplifier includes an erbium-doped optical fiber.

4. An optical communication system including a remote amplifier station as described in claim 1 located under water, and further including:
    a first underwater optical fiber cable connected between a first land station and the first transmission port and providing the first optical transmission path;
    a second underwater optical fiber cable connected between a second land station and the second transmission port and providing the second optical transmission path;
    a third underwater optical fiber cable connected between the first optical port and a first above-water access station; and
    a fourth underwater optical fiber cable connected between the second optical port and a second above-water access station.

5. An optical communication system according to claim 4 wherein each of the first and second above-water access stations comprises a buoy positioned above the remote amplifier station.

6. A method of evaluating a fault in an optical communication system, the system including a remote amplifier station comprised of a doped optical fiber, the amplifier station being connected by respective first and second transmission ports to first and second optical transmission paths, and further including a first and a second bidirectional optical branching device, the first branching device being connected to couple a first amplified light signal from the optical amplifier and a light signal from a first optical test port to the first transmission path, and to split a light signal from the first transmission path into components for delivery to the first optical port and to the optical amplifier, the second branching device being connected to couple a second amplified light signal from the optical amplifier and a light signal from a second optical test port to the second transmission path, and to split a light signal from the second transmission path into components for delivery to the second optical test port and to the optical amplifier, the method comprising:
    coupling an ODOR to the one of the first and second optical test ports closest to the fault;
    transmitting an optical test signal from the ODOR toward the fault through the connected optical test port and the: optical branching device associated therewith;
    receiving a reflection of the optical test signal from the fault; and processing the reflection to evaluate the fault.

\* \* \* \* \*